(12) United States Patent
Boncha et al.

(10) Patent No.: US 9,089,915 B2
(45) Date of Patent: Jul. 28, 2015

(54) METHOD FOR MANUFACTURING MULTI-PIECE BONDED GRAPHITE BLANKS FOR EDM

(71) Applicants: Scott L. Boncha, Chardon, OH (US); Dale McCartney, Chardon, OH (US)

(72) Inventors: Scott L. Boncha, Chardon, OH (US); Dale McCartney, Chardon, OH (US)

(73) Assignee: Scott L. Boncha, Chardon, OH (US)

( * ) Notice: Subject to any disclaimer, the term of this patent is extended or adjusted under 35 U.S.C. 154(b) by 243 days.

(21) Appl. No.: 13/708,372

(22) Filed: Dec. 7, 2012

(65) Prior Publication Data

US 2014/0158290 A1 Jun. 12, 2014

Related U.S. Application Data

(60) Provisional application No. 61/567,732, filed on Dec. 7, 2011, provisional application No. 61/694,332, filed on Aug. 29, 2012.

(51) Int. Cl.
*B23H 1/06* (2006.01)
*B32B 38/00* (2006.01)
*B23H 1/04* (2006.01)

(52) U.S. Cl.
CPC .. *B23H 1/06* (2013.01); *B23H 1/04* (2013.01); *B32B 38/0004* (2013.01); *Y10T 156/1062* (2015.01)

(58) Field of Classification Search
CPC ...... B32B 38/00; B32B 38/0004; B23H 1/04; B23H 1/06; Y10T 56/1062
USPC ......................................... 156/250, 253, 256
See application file for complete search history.

(56) References Cited

U.S. PATENT DOCUMENTS

| | | | | |
|---|---|---|---|---|
| 3,530,271 A | * | 9/1970 | Ullmann et al. | 219/69.15 |
| 4,156,327 A | * | 5/1979 | O'Connor | 451/28 |
| 2006/0198419 A1 | * | 9/2006 | Intermill et al. | 373/93 |

* cited by examiner

*Primary Examiner* — Mark A Osele
*Assistant Examiner* — Christopher C Caillouet
(74) *Attorney, Agent, or Firm* — White-Welker & Welker, LLC; Matthew T. Welker, Esq.

(57) ABSTRACT

A method of manufacturing a two-piece or composite graphite blank applicable for EDM or other similar needs. The composite electrode will combine a low cost backer substrate material manufactured to size for fixture holding without additional machining for attachment with a high cost material sufficient for the EDM process. The two pieces will be physically attached by an adhesive suitable for bonding graphite or copper impregnated graphite. The pre no-machining backer material sized for fixture holding reduces waste and machining costs for end users.

19 Claims, 6 Drawing Sheets

METHOD FOR MANUFACTURING MULTI-PIECE BONDED GRAPHITE BLANKS FOR EDM

CROSS REFERENCE TO RELATED APPLICATIONS

This application claims priority from U.S. Provisional Patent Application Ser. No. 61/567,732, entitled "A METHOD FOR MANUFACTURING MULTI-PIECE BONDED GRAPHITE BLANKS FOR EDM", filed on 7 Dec. 2011.

This application claims priority from U.S. Provisional Patent Application Ser. No. 61/694,332, entitled "A METHOD FOR MANUFACTURING MULTI-PIECE BONDED GRAPHITE BLANKS FOR EDM", filed on 29 Aug. 2012.

FEDERALLY SPONSORED RESEARCH

Not Applicable

SEQUENCE LISTING OR PROGRAM

Not Applicable

TECHNICAL FIELD OF THE INVENTION

The present invention relates generally to a method and process for creating graphite blanks. More specifically, the present invention relates to a method for creating multi-piece bonded graphite blanks.

BACKGROUND OF THE INVENTION

The inventors business involves machining large blocks of graphite into smaller precision shapes and sizes (commonly referred to as blanks) per an individual customer's specification. The largest portion of this business is the creation of rectangular blank shapes for electrical discharge machining (EDM). EDM is typically used within machine shops for the manufacture of hardened steel molds or dies that require intricate details.

The one piece graphite blank is an industry standard for EDM (electrical discharge machining) applications. It is highly reliable and relatively easy to machine into the desired shape for the EDM process. The standard one-piece electrode blank consists of a fixture holding area used to secure the electrode within the machine. The remaining area is used to contact the workpiece for the EDM or arcing/burning away of the workpiece material. However, the standard one-piece electrode is not an efficient use of material in many instances. When high cost material is required for the EDM process and the graphite used in the attachment area does not require the same, an inefficiency of material usage is created.

The dense high cost graphite material required for the arcing/burning of the work piece is not necessary for the graphite used for the fixture work holding area. Low cost graphite material can be used in this area. Thus, the one-piece electrode is inefficient use of material.

SUMMARY OF THE INVENTION

The present invention is a method of manufacturing a two-piece or composite graphite blank applicable for EDM or other similar needs. The composite electrode will combine a low cost substrate material for attachment with a high cost material sufficient for the EDM process. The two pieces will be physically attached by an adhesive suitable for bonding graphite or copper impregnated graphite.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION OF THE INVENTION

Figure 1:
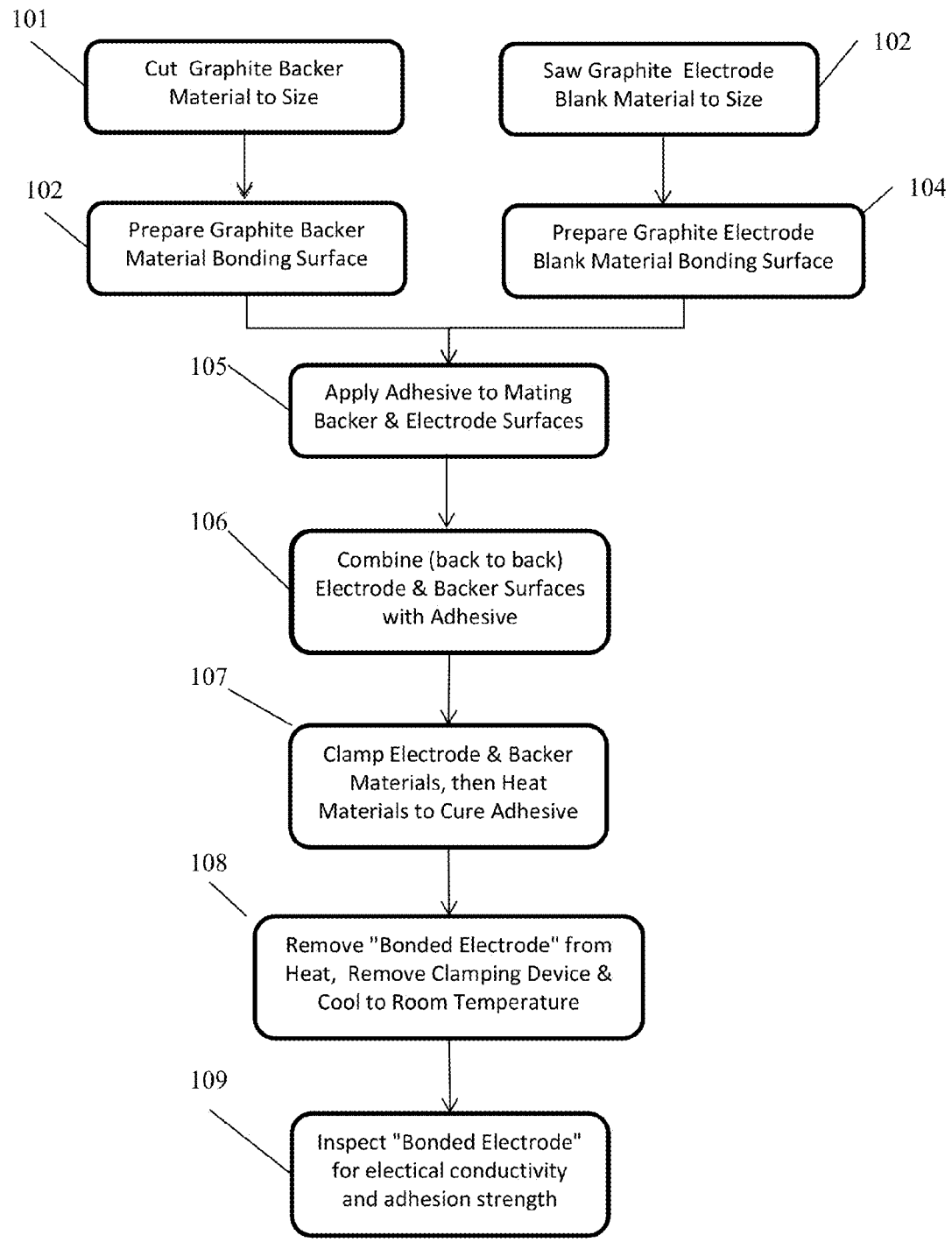
FIG. 1 is a flow chart illustrating the steps in the method and process for of manufacturing a two-piece or composite graphite blank applicable for EDM or other similar needs as taught by the present invention.

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention. Referring to the figures, it is possible to see the various major elements constituting the apparatus of the present invention.

Electric discharge machining (EDM) or arc erosion is a manufacturing process whereby a desired shape is obtained using electrical discharges, pulses or sparks. Material is removed from the workpiece by a series of rapidly repeating electrical discharges between two conductive electrodes, separated by a dielectric liquid and subject to an electric voltage. As the electrode approaches the workpiece submerged in the dielectric liquid small spark jumps from the electrode to the workpiece. A power supply generates an electrical potential between the electrode and the workpiece. One of the electrodes is called the tool-electrode, or simply the electrode, while the other is called the workpiece.

The inventors are a manufacturer of graphite blanks that are used as electrodes in the EDM process. The graphite is purchased in large blocks (typical block size=12"×24"×36"). The majority of blanks are rectangular in shape. The most common rectangular blanks range in size from 0.005"×0.100"×0.500" to 6.000"×12.000"×24.000". Typically customers machine the blanks into the desired shape where it then becomes an electrode. Other geometry shapes are also available (rounds, hexagonals, special CNC within a range of sizes. However, this invention is most applicable to rectangular shapes.

There are various grades or classes of graphite used for EDM blanks. Although other graphite characteristics may vary, typically the grades are divided by the material's apparent density or grain size. The grain sizes vary from less than 1 micron to 10 microns. The cost of the 1 micron material may be five to ten times that of the 10 micron low cost material which is important to this invention.

At least two classes of the graphite supplies are copper impregnated graphite grades. The copper impregnated materials are used when the workpiece conductivity is poor or wear is a critical issue within the work pieces. The cost of the copper impregnated materials may be thirteen times that of the 10 micron low cost material.

Figure 4:
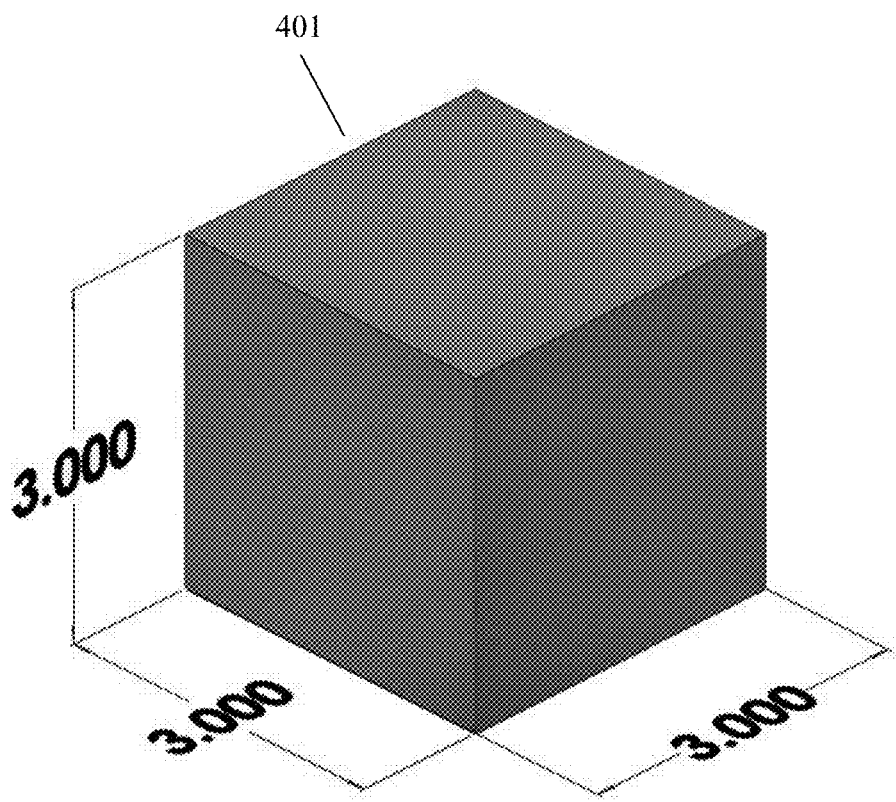
FIG. 4 illustrates a standard solid blank.

Each graphite blank used within an EDM machine requires orientation and attachment to the EDM machine. This is achieved by clamps, mechanical fasteners or other "holding" combinations. The area of each blank where this attachment occurs never contacts the steel where the high cost material is of importance. To date all EDM blanks produced use one piece blanks 401 as shown in FIG. 4.

The present invention is a method of manufacturing a two-piece or composite graphite blank applicable for EDM or other similar needs as shown in FIGS. 3a-3d. The composite electrode will combine a low cost substrate material for attachment with a high cost material sufficient for the EDM process. The two pieces will be physically attached by an adhesive suitable for bonding graphite or copper impregnated graphite.

Referring to FIG. 1, the bonding process begins by cutting two pieces of graphite into a desired shape (rectangular, round, other) in step 101 for the graphite back and step 102 for the graphite electrode blank material. Typically both pieces are rectangular or cylindrical. However each piece could be any geometric shape with mating surfaces adequate for bonding.

The "bonded electrode" is typically comprised of two pieces, but could be three or more if required. The first piece is the "substrate or backer" and the second piece is the "electrode blank". When combined they are a "multi-piece bonded electrode blank". The substrate portion is typically a low cost graphite material used for securing the "bonded blank" in the EDM machine. The electrode portion is a more-dense, high cost graphite material used at the point of contact to efficiently erode the hardened steel or other material into the desired shape using the EDM process.

Figure 2:
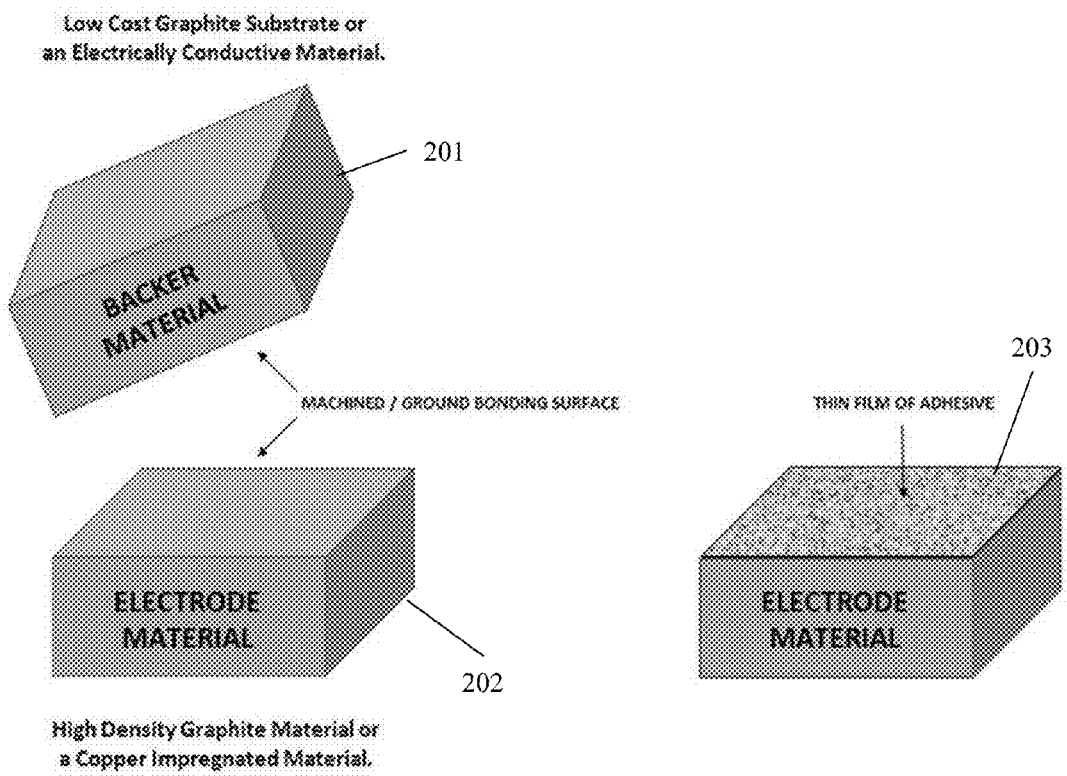
FIG. 2 illustrates the general shape bonding.

After cutting both the backer and the electrode to the desired shape in steps 101 and 102, a surface on each must be chosen to be placed back to back for bonding. These two surfaces (one on the backer and one on the electrode) are typically machined flat in preparation for the adhesive in steps 103 and 104. Machining is necessary to minimize irregularities on the mating surfaces. A flat surface with machining lines is desired for adhesion. Large irregularities will reduce the electrical conductivity between the backer and the electrode which is not desirable. The mating surfaces can be flat, contoured or stepped but for ease of fit and adhesion, two flat surfaces are preferred as shown in FIG. 2 for the backer material 201 and electrode material 202.

After machining of the backer and electrode blank bonding surfaces, an adhesive 203 is placed between the pieces using an applicator or a brush in step 105. The bonding surfaces of the backer and electrode blank are then placed back to back and aligned in step 106. A mechanical, pneumatic or hydraulic clamping device applies mechanical pressure to the backer and electrode in step 107.

The combined backer and electrode, now held together with the clamping device is heated to approximately 300 degrees F. (adhesive dependent) until the adhesive is cured. Heating of the workpiece is achieved by an oven, induction heating or another type of heated container.

The required clamping force varies by the size of the workpiece. The applied mechanical force (typically 10 to 40 psi, adhesive dependent) is required to reduce the adhesive thickness before curing. Therefore, larger pieces with more surface area require a larger clamping force to reduce the thickness of the applied adhesive to a thin film adhesive (less than 0.005" thickness for acceptable electrical conductivity).

The adhesive curing time is dependent upon the cross section of the bonded electrode. Larger pieces may require several hours to cure (larger cross section) while small bonded electrodes may require only minutes. Upon completion of the heating cycle, cool down time is required for the bonded electrode blank in step 108. The clamping force is then removed and the bonded electrode blank is ready for use within the EDM process after it is inspected for electrical conductivity and adhesion strength in step 109.

Referring now to FIG. 2, the general shape bonding is shown. The present invention is a method to manufacture a multi-piece (a two piece illustration is shown in FIG. 2) or bonded graphite blank applicable for electrical discharge machining (EDM) or other similar needs. The bonded electrode blank will combine a low cost substrate or backer graphite material 201 in the fixture holding area and a dense high cost graphite material sufficient for the EDM or arc/burning away of the work piece material 202. The multiple pieces will be physically attached by an adhesive 203 suitable for bonding graphite or copper impregnated graphite. The benefit of the two piece bonded electrode blank reduces the amount of high cost graphite consumed during fabrication by substituting low cost graphite material as a substrate in the fixture holding area.

Now referring to FIGS. 3a-3d, a specific shape to accommodate standard EDM work holding devices is shown. An attachment of the one piece electrode within the EDM machine often requires removal of high cost material by milling or grinding to create geometry (cube, elongated cube, other) for work holding devices. The bonded electrode blank avoids this and saves the use of graphite material by separately machining the fixture work holding area to size, then bonding the higher cost graphite electrode for the burning or arc area.

Figures 3A, 3B, 3C, 3D:
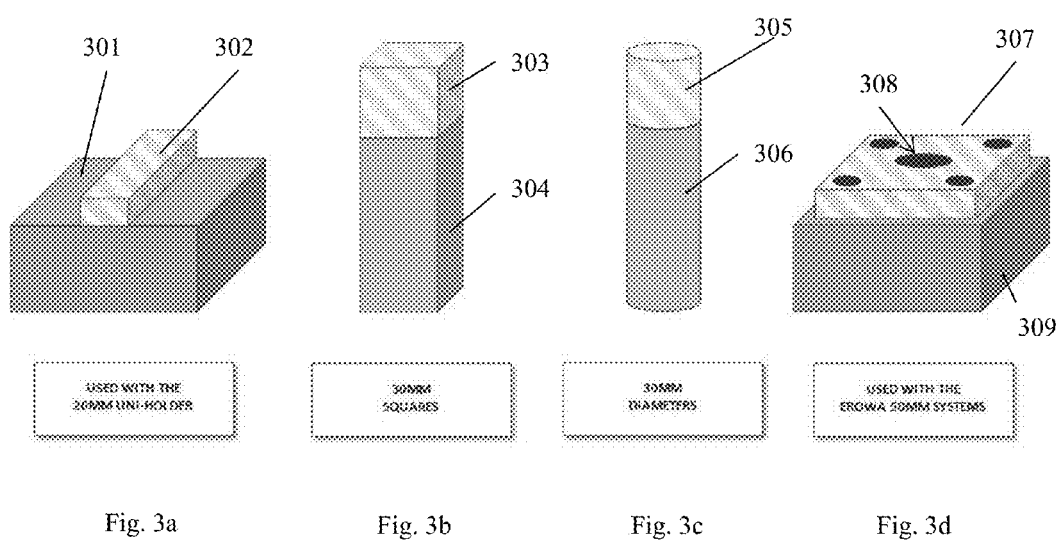
FIGS. 3a-3d illustrates a specific shape to accommodate standard EDM work holding devices.

FIG. 3a illustrates a rectangular electrode blank 301 is secured to a smaller rectangular substrate material 302 for use with a 20 MM uni-holder. FIG. 3b illustrates a square electrode blank 304 is secured to a same sized square substrate material 303 for use with a 30 MM square holder. FIG. 3c illustrates a round electrode blank 306 is secured to a same sized square substrate material 305 for use with a 30 MM diameter circular holder. FIG. 3d illustrates a rectangular electrode blank 309 is secured to a smaller rectangular substrate material 307 with a plurality of holes 308 for use with the EROWA 50 MM system.

It is believed that the most efficient way of combining the two materials 201 and 203 will be to saw, grind, and bond graphite slabs sawed from the large blocks as illustrated in FIG. 2. Composite blocks will be generated from the low cost "backing" or substrate graphite material after bonded with the high cost materials that contact with the workpiece.

The current adhesive 203 used for testing requires both pressure and heat for a period of time to bond the two graphite pieces. To be efficient, production will most likely require the pressing and bonding of multiple "composite slabs" inside a heated 300 degree F. chamber.

Upon completion of the "slab bonding", composite blanks would be sawed and machined or ground to size as shown in FIG. 2. To identify the substrate material, a marking system via machining or etching will be required to identify the substrate material for proper orientation into the EDM machine.

Work performed to date on bonded graphite blank applications has included the use of dis-similar graphite materials and their properties. Such materials include both isotropically molded and extruded synthetic graphites. Of particular interest has been the bonded graphite properties of materials used for electrical discharge machining (EDM) applications. To date, the Inventors have tested several adhesives and baking processes to ensure structural integrity, electrical conductivity and EDM performance. The EDM performance tests included metal removal rate, electrode wear and the quality of work piece surface finishes.

Figure 5:
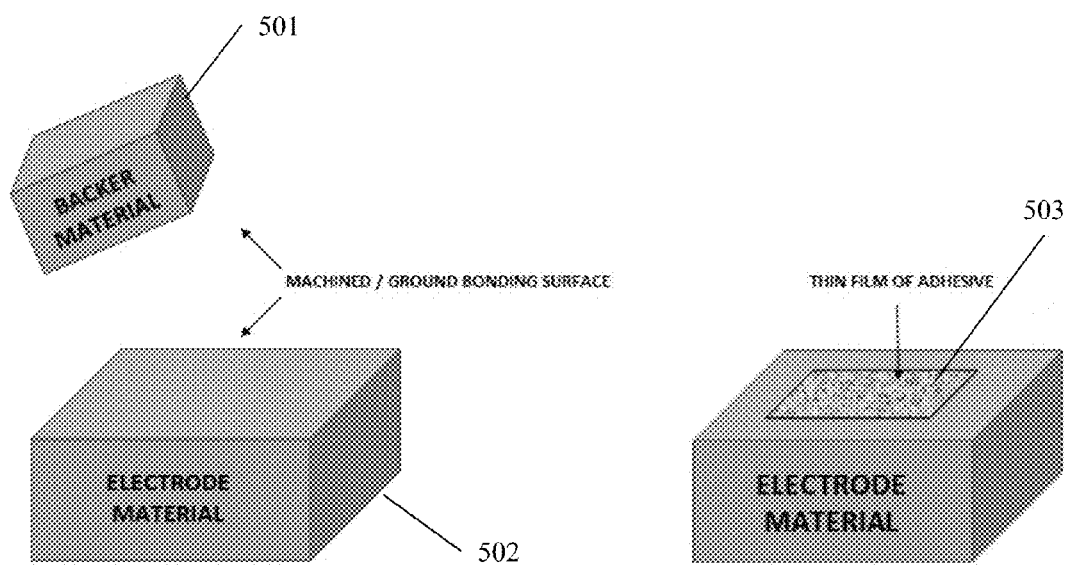
FIG. 5 illustrates the improved backer material and electrode material as attached with a thin file of adhesive in combination for an improved embodiment of the invention.
Figure 6:
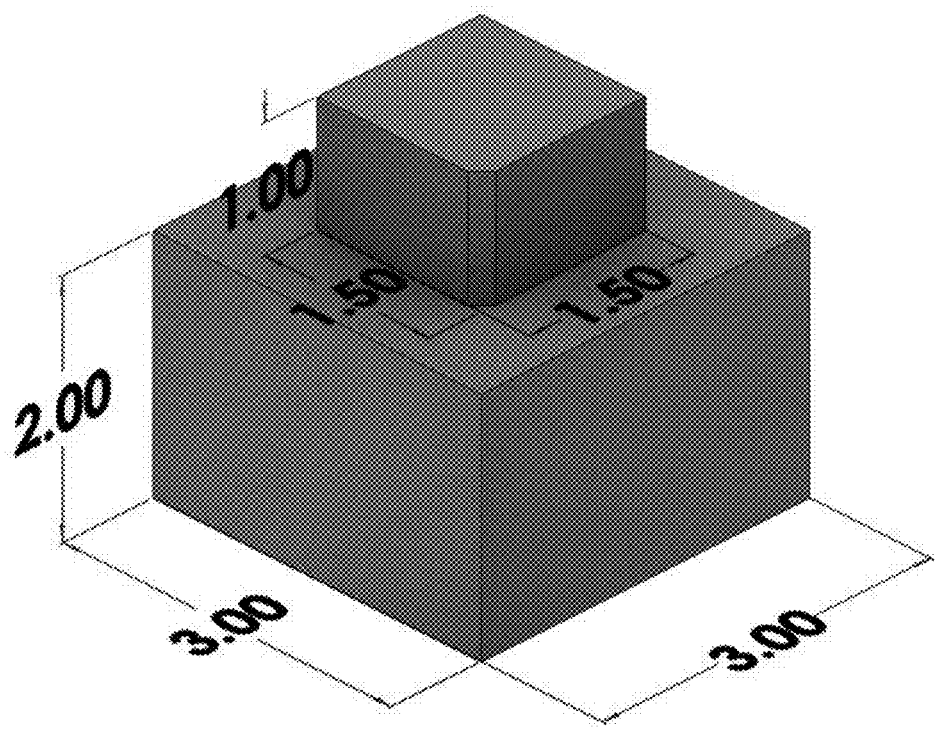
FIG. 6 illustrates the electrode material and backer material combination of an improved embodiment of the present invention.

During this development several testing variables were designed into the formats including the relationship between the fixture holding area "the backer" and the material contacting the work piece "electrode blank" size. Through experimentation, the Inventors found that when a small low density material "backer" 501 could be adhesively bonded to a larger medium or high density material "electrode blank" 502 using a thin film of adhesive 503 as shown in FIGS. 5 and 6, significant cost savings were created.

The savings were directly related to the material volume difference between the "backer" and the "burner" as noted in the Table below.

TABLE 1

| | Size "X" | Size "Y" | Size "Z" | Material Volume (in³) | Cost per cubic inch | Cost |
|---|---|---|---|---|---|---|
| One Piece Rectangular EDM Electrode | 3 | 3 | 3 | 27 | $4.80 | $129.60 |
| Low Density Backer (Smaller Backer) | 1 | 1 | 1 | 3 | $0.88 | $2.64 |
| High Density Burner (Larger Electrode combined with the Backer) | 3 | 3 | 2 | 18 | $4.80 | $86.40 |
| Combined Backer & Electrode Burner Cost | — | — | — | — | — | $89.04 |
| Savings ea. from Multi-Size Bonded Blank | — | — | — | — | — | $40.56 |

As within the original embodiment shown in FIGS. 1-4, an additional benefit of the improved embodiment 601 shown in FIGS. 5-6 is that the "backer" 501 can be manufactured to size for fixture holding without additional machining. This "pre no-machining" condition saves the user significant machine time and improves throughput.

Thus, it is appreciated that the optimum dimensional relationships for the parts of the invention, to include variation in size, materials, shape, form, function, and manner of operation, assembly and use, are deemed readily apparent and obvious to one of ordinary skill in the art, and all equivalent relationships to those illustrated in the drawings and described in the above description are intended to be encompassed by the present invention.

Furthermore, other areas of art may benefit from this method and adjustments to the design are anticipated. Thus, the scope of the invention should be determined by the appended claims and their legal equivalents, rather than by the examples given.

The invention claimed is:

1. A method for creating a multi-piece bonded graphite blanks comprising the steps of:
   determining the size and shape of a backer substrate with respect to a holding fixture;
   determining the size and shape of an electrode substrate;
   cutting two pieces of graphite into a desired shape to create a backer substrate and an electrode substrate;
   choosing a surface on the backer and electrode substrates to be placed back to back for bonding
   machining a first, chosen surface of the backer substrate flat in preparation for the adhesive;
   machining a first, chosen surface of the electrode substrate flat in preparation for the adhesive;
   applying a film of adhesive to the first machined surface of the electrode substrate in the same size and shape of the first machined surface of the backer substrate;
   placing the machined surfaces back to back for bonding;
   placing the bonding surfaces of the backer and electrode back to back and aligned;
   applying a mechanical pressure to the backer and electrode by a clamping device,
   heating the combined backer and electrode, now held together with the clamping device until the adhesive is cured;
   allowing the adhesive to cure;
   providing a cool down time upon completion of the heating cycle; and
   removing the clamping force from the finished EDM blank.

2. The method of claim 1, wherein the adhesive is placed between the pieces using an applicator or a brush.

3. The method of claim 1, wherein the combined backer and electrode are held together with the clamping device to approximately 300 degrees F. until the adhesive is cured.

4. The method of claim 1, wherein the substrates are made from isotropically molded and extruded synthetic graphites.

5. The method of claim 1, wherein the electrode substrate is made from a copper impregnated material.

6. The method of claim 1, wherein the backer substrate is manufactured to size for fixture holding.

7. The method of claim 1, wherein the two pieces are physically attached by an adhesive suitable for bonding graphite or copper impregnated graphite.

8. The method of claim 1, wherein both pieces are rectangular or cylindrical.

9. The method of claim 1, wherein
   the substrate portion is a low density graphite material used for securing the bonded blank in an EDM machine; and
   the electrode portion is a larger, higher density graphite material compared to the lower density graphite material used for the substrate portion, used at the point of contact to efficiently erode the hardened steel or other material into the desired shape using the EDM process.

10. The method of claim 1, wherein the machined surfaces are flat, contoured, or stepped.

11. The method of claim 1, wherein a mechanical, pneumatic or hydraulic clamping device applies mechanical pressure to the backer and electrode.

12. The method of claim 1, wherein the required clamping force is 10 to 40 psi.

13. The method of claim 1, wherein a rectangular electrode blank is secured to a smaller rectangular substrate material for use with a 20 MM uni-holder.

14. The method of claim 1, wherein a square electrode blank is secured to a same sized square substrate material for use with a 30 MM square holder.

15. The method of claim 1, wherein a round electrode blank is secured to a same sized square substrate material for use with a 30 MM diameter circular holder.

16. The method of claim 1, wherein a rectangular electrode blank is secured to a smaller rectangular substrate material with a plurality of holes for use with the EROWA 50 MM system.

17. The method of claim 1, wherein a slab bonding process comprises the steps of pressing and bonding of one or more composite slabs occurs inside a heated 300 degree F. chamber, resulting in a plurality of composite blanks.

18. The method of claim 17, wherein, upon completion of the slab bonding process, in a final step, composite blanks are sawed and machined or ground to size.

19. The method of claim 17, wherein, the backer is manufactured to size for fixture holding without additional machining.

\* \* \* \* \*